(12) United States Patent
Hamada et al.

(10) Patent No.: US 8,559,527 B2
(45) Date of Patent: Oct. 15, 2013

(54) IMAGE DISPLAY APPARATUS

(75) Inventors: Koichi Hamada, Yokohama (JP);
Masahiro Kageyama, Hino (JP);
Muneaki Yamaguchi, Inagi (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 1463 days.

(21) Appl. No.: 11/672,610

(22) Filed: Feb. 8, 2007

(65) Prior Publication Data
US 2007/0242080 A1    Oct. 18, 2007

(30) Foreign Application Priority Data

Apr. 17, 2006    (JP) ................................. 2006-112897

(51) Int. Cl.
*H04N 11/02*    (2006.01)

(52) U.S. Cl.
USPC .................. 375/240.27; 375/240.16; 382/238

(58) Field of Classification Search
USPC ........... 375/240.27, 240.16, 240.24; 382/236, 382/238
See application file for complete search history.

(56) References Cited

U.S. PATENT DOCUMENTS

| | | | |
|---|---|---|---|
| 4,663,665 A | | 5/1987 | Tanaka et al. |
| 5,737,022 A | | 4/1998 | Yamaguchi et al. |
| 5,796,438 A | | 8/1998 | Hosono |
| 5,990,958 A | * | 11/1999 | Bheda et al. ............... 348/407.1 |
| 7,684,492 B2 | * | 3/2010 | Seo ........................... 375/240.27 |
| 2004/0021592 A1 | * | 2/2004 | Karczewicz .................... 341/67 |
| 2004/0227851 A1 | | 11/2004 | Min |
| 2004/0234143 A1 | * | 11/2004 | Hagai et al. .................... 382/238 |
| 2005/0030569 A1 | * | 2/2005 | Tabata et al. ................. 358/1.13 |
| 2005/0149831 A1 | * | 7/2005 | Katsavounidis et al. ...... 714/776 |
| 2006/0212908 A1 | * | 9/2006 | Hunter et al. .................... 725/70 |
| 2006/0269153 A1 | * | 11/2006 | Shi et al. ........................ 382/236 |
| 2007/0086527 A1 | * | 4/2007 | Yan .......................... 375/240.24 |
| 2007/0127572 A1 | * | 6/2007 | Sasai et al. ............... 375/240.16 |
| 2007/0242750 A1 | * | 10/2007 | De Haan et al. .......... 375/240.16 |
| 2008/0260268 A1 | * | 10/2008 | Someya et al. ............... 382/238 |

FOREIGN PATENT DOCUMENTS

| | | |
|---|---|---|
| CN | 86100610 | 7/1986 |
| CN | 1118553 | 3/1996 |
| CN | 1243621 | 2/2000 |
| JP | 62-039988 | 2/1987 |

(Continued)

OTHER PUBLICATIONS

Yang, "An Efficient Packet Loss Recovery Methodology for Video Streaming over IP Networks", 2009, IEEE, vol. 55, p. 190-201.*

*Primary Examiner* — Taghi Arani
*Assistant Examiner* — Gregory Lane
(74) *Attorney, Agent, or Firm* — Antonelli, Terry, Stout & Kraus, LLP.

(57) ABSTRACT

An object of the present invention is to provide a technique of appropriately compensating for loss of even an entire image frame due to data error such as a transmission error to allow display of a high quality image. An image display apparatus of the present invention comprises: a decoding unit which decodes an encoded bit stream into an image signal; an interpolation image generating unit which generates an interpolation frame based on frames of the decoded image signal; and a control unit which detects an error in the encoded bit stream and controls the interpolation image generating unit; wherein when a frame of the encoded bit stream is lost (that is, it has not been able to be decoded) due to an uncorrectable error, the above interpolation frame is displayed instead of the lost frame.

15 Claims, 7 Drawing Sheets

(56) References Cited

FOREIGN PATENT DOCUMENTS

| JP | 02-237286 | 9/1990 |
| JP | 2002-135786 | 5/2002 |
| JP | 2002-354488 | 12/2002 |
| JP | 2004-343715 | 12/2004 |
| JP | 2005-295054 | 10/2005 |
| WO | WO 99/14866 | 3/1999 |

* cited by examiner

IMAGE DISPLAY APPARATUS

CLAIM OF PRIORITY

The present application claims priority from Japanese application serial no. JP 2006-112897, filed on Apr. 17, 2006, the content of which is hereby incorporated by reference into this application.

BACKGROUND OF THE INVENTION (1) Field of the Invention

The present invention relates to an image display apparatus capable of decoding an encoded bit stream and displaying it.

(2) Description of the Related Art

In IP broadcasting, an image is compressively encoded (i.e., encoded and compressed) according to a syntax specified by MPEG-2, H.264/AVC, etc. into an encoded bit stream, which is transmitted through a network, etc. At that time, if the encoded bit stream has suffered a transmission error, it is usually corrected by, for example, FEC (Forward Error Correction). However, the error may be of the type that cannot be corrected even by such an error correction technique. In that case, the erroneous data (portion) is discarded and hence is not subjected to a decode process. Known techniques for compensating for such data loss include, for example, those disclosed in Japanese Laid-Open Patent Publication Nos. 2005-295054 and 2002-354488.

When a macroblock in an encoded bit stream is corrupted or lost due to an uncorrectable error, the techniques described in these patent publications replace it with a block within a reference image (or the previous frame) indicated by a motion vector for a macroblock adjacent the corrupted or lost macroblock.

SUMMARY OF THE INVENTION

Each image frame in an encoded bit stream includes ID data for identifying the image frame. If this ID data is corrupted due to an uncorrectable error, the entire image frame may need to be discarded or may be lost. Further, in the case of a stream encoded on a per-frame basis, if all packets constituting the frame cannot be decoded, the frame might be discarded.

The above patent publications do not take into account the fact that all data (packets) constituting one frame might be corrupted or lost, and therefore cannot handle such frame loss. Specifically, the techniques disclosed in these patent publications restore data of a lost macroblock based on a motion vector(s) for an adjacent macroblock(s). Therefore, if an entire frame is corrupted or lost, these techniques cannot appropriately restore (or conceal) its macroblocks by interpolation, etc. since there is no uncorrupted macroblock and hence no motion vector available for that purpose.

The present invention has been devised in view of the above problems. It is, therefore, an object of the present invention to provide a technique for appropriately compensating for loss of an image frame by interpolation, etc. to allow display of a high quality image.

The present invention is characterized by the steps of: generating an interpolation frame based on frames of an image signal decoded from an encoded bit stream; and when a frame of the image signal is lost (that is, it has not been able to be decoded from the encoded bit stream) due to an uncorrectable error, displaying the generated interpolation frame instead of the lost frame. For example, an image display apparatus of the present invention normally displays an image signal frame sequence decoded from the encoded bit stream without modification. However, if a frame of the image signal is lost, the image display apparatus inserts the above interpolation frame into the decoded frame sequence at the same position in time as the lost frame before displaying the sequence.

The image display apparatus may generate the interpolation frame based on two frames, one preceding and the other succeeding the lost frame. More specifically, the image display apparatus may determine a motion vector for each pixel in the interpolation frame (which is a replacement for the lost frame) based on the image signals in these preceding and succeeding frames, and generates the pixel (or determines the luminance or pixel value of the pixel) based on an average of (the luminance or pixel values of) pixels in the preceding and succeeding frames indicated by the determined motion vector.

This allows the image display apparatus to display a complete image frame sequence even when one of the frames is lost due to a transmission error, etc. by replacing the lost frame with the interpolation frame, thereby preventing disturbance and interruption of the image display due to the frame loss.

Thus, the present invention provides a technique for appropriately compensating for loss of an image frame to allow display of a high quality image.

BRIEF DESCRIPTION OF THE DRAWINGS

These and other features, objects and advantages of the present invention will become more apparent from the following description when taken in conjunction with the accompanying drawings, wherein:

FIG. 6 (including FIGS. 6A and 6B) is a diagram showing an exemplary operation of the interpolation image generating unit 4 according to the first embodiment of the present invention;

DETAILED DESCRIPTION OF THE PREFERRED EMBODIMENTS

Preferred embodiments of the present invention will be described with reference to the accompanying drawings.

First Embodiment

Figure 1:
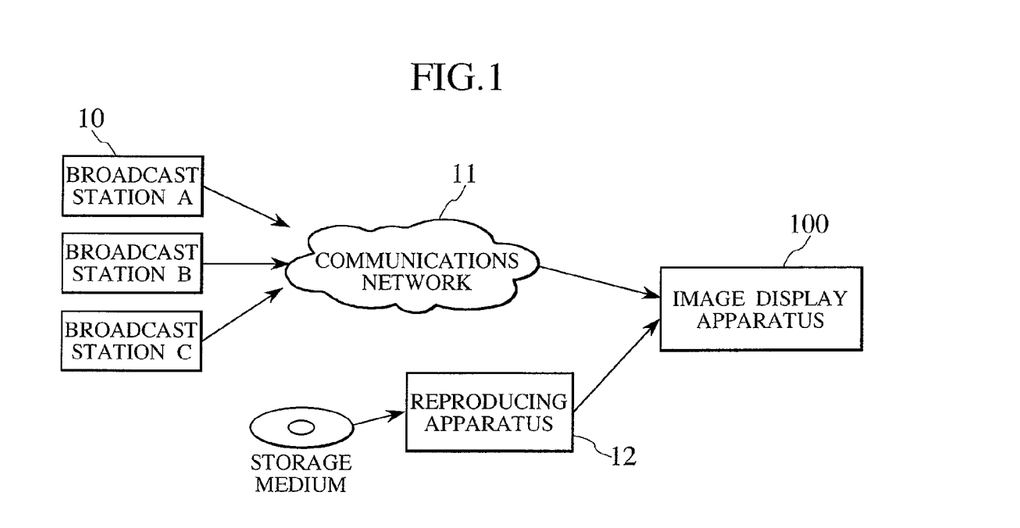
FIG. 1 is a diagram showing an image display apparatus according to a first embodiment of the present invention.

FIG. 1 shows an exemplary application of an image display apparatus 100 according to a first embodiment of the present invention. Referring to the figure, the image display apparatus 100 receives an encoded stream made up of encoded image and sound data, etc. from broadcast stations 10A to 10C through a communications network 11 in IP broadcasting. Further, the image display apparatus 100 can be connected to an external reproducing apparatus 12 (a HDD player, a DVD player, etc.) so as to receive an encoded stream read from a storage medium (a DVD, etc.) by the external reproducing apparatus 12.

Figure 2:
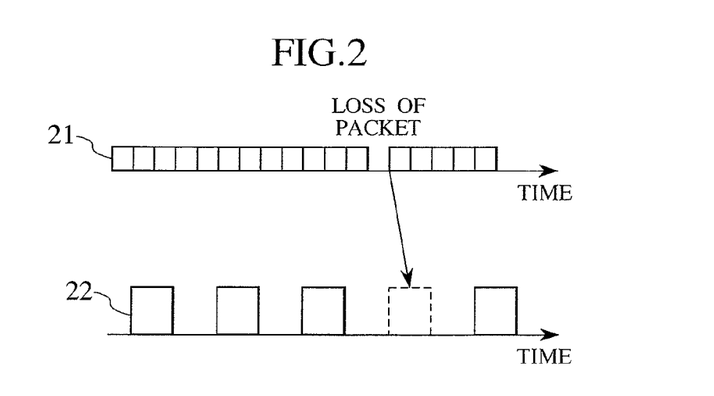
FIG. 2 is a diagram showing an example of loss of an image frame due to data loss.

It should be noted that the encoded stream supplied through the communications network 11 or supplied from the reproducing apparatus 12 is generated according to a syntax specified by MPEG-2, MPEG-4, H.264/AVC, etc. However, as the encoded stream is transmitted through the communications network 11, it may suffer a transmission error. Further, when the encoded stream is read from the storage medium by the reproducing apparatus 12, a read error may occur due to damage to the storage medium or due to foreign particles attached to it, etc. Such errors may not be able to be corrected even by FEC, resulting in loss of the entire image frame. For example, an entire frame may be lost if the ID information of the frame has suffered an uncorrectable error, or if all packets constituting the frame cannot be decoded when the stream has been encoded on a per-frame basis. FIG. 2 shows an example of loss of a frame.

Each encoded stream is made up of a plurality of packets 21, as shown in FIG. 2. These packets 21 are collectively decoded into a series of image frames 22. If data in one of the packets 21 is corrupted or lost due to, for example, a transmission error, the entire image frame including (or corresponding to) the corrupted packet may be lost (or may need to be discarded). The present embodiment has been devised to allow display of a high quality image even if such frame loss occurs. The present embodiment will be described in detail with reference to FIGS. 3 to 7.

Figure 3:
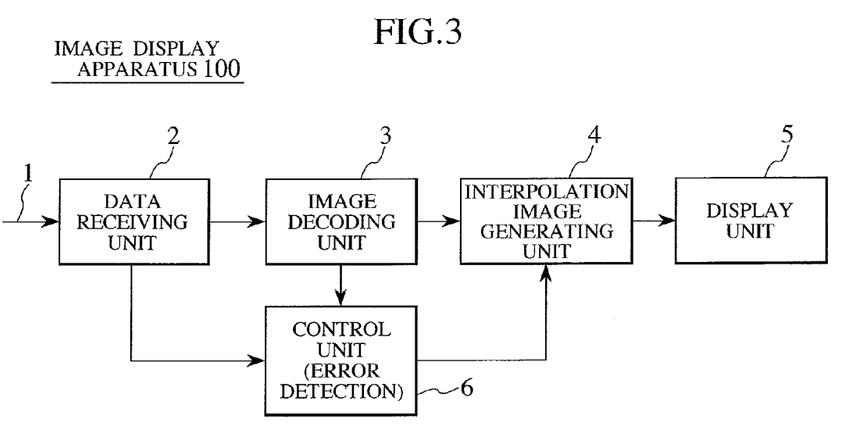
FIG. 3 is a diagram showing an exemplary configuration of the image display apparatus according to the first embodiment of the present invention.

FIG. 3 shows an image display apparatus 100, such as that shown in FIG. 1, according to the present embodiment. Referring to FIG. 3, a data receiving unit 2 receives an encoded stream 1 from the communications network 11 or the reproducing apparatus 12. The data receiving unit 2 outputs the received encoded stream 1 to an image decoding unit 3 which decodes it into an image signal made up of a plurality of frame sequences and outputs the decoded image signal to an interpolation image generating unit 4.

The interpolation image generating unit 4 generates an interpolation frame when a frame in the frame sequence output from the image decoding unit 3 is lost due to an uncorrectable error, etc. The interpolation image generating unit 4 inserts the generated interpolation frame into the frame sequence at the same position in time as the lost frame. That is, the interpolation image generating unit 4 replaces the lost frame with the interpolation frame. The signal output from the interpolation image generating unit 4 is input to a display unit 5 made up of a PDP, an LCD, etc. The display unit 5 displays an image based on the output signal from the interpolation image generating unit 4, that is, based on the restored frame sequence that includes the frame sequence output from the image decoding unit 3 and the interpolation frame generated by the interpolation image generating unit 4.

A control unit 6 obtains error information through the data receiving unit 2 and/or the image decoding unit 3 and controls the interpolation image generating unit 4 based on this error information. For example, in the case of MPEG-2, a bit stream is transmitted on a per-packet basis. Therefore, the value of the continuity counter may be compared to the header of each incoming packet to determine whether or not a data loss has occurred. That is, the control unit 6 may compare the value of the continuity counter (for counting packet headers) and the header of each packet received by the data receiving unit 2 to determine whether or not a frame has been lost. Or if the encoded bit stream has been generated according to, for example, the MPEG-2 standard, the control unit 6 may determine the occurrence of a frame loss due to an uncorrectable error when it has detected data that does not conform to the MPEG-2 syntax. Further, the control unit 6 may check the CRC information in each packet to determine the data integrity and thereby determine whether an error has occurred.

The control unit 6 controls the interpolation image generating unit 4 to generate an interpolation frame and supply it to the display unit 5 with the timing of a lost frame. That is, the control unit 6 controls the interpolation image generating unit 4 such that the interpolation image generating unit 4 outputs each decoded image signal frame if it is not lost due to an error and otherwise outputs an interpolation frame. It should be noted that the interpolation image generating unit 4 generates an interpolation frame by use of a motion compensation technique. Specifically, it generates an interpolation frame based on the image signals in the frames immediately preceding and succeeding the lost frame. The frame interpolation performed by the interpolation image generating unit 4 will be conceptually described with reference to FIG. 4.

Figure 4:
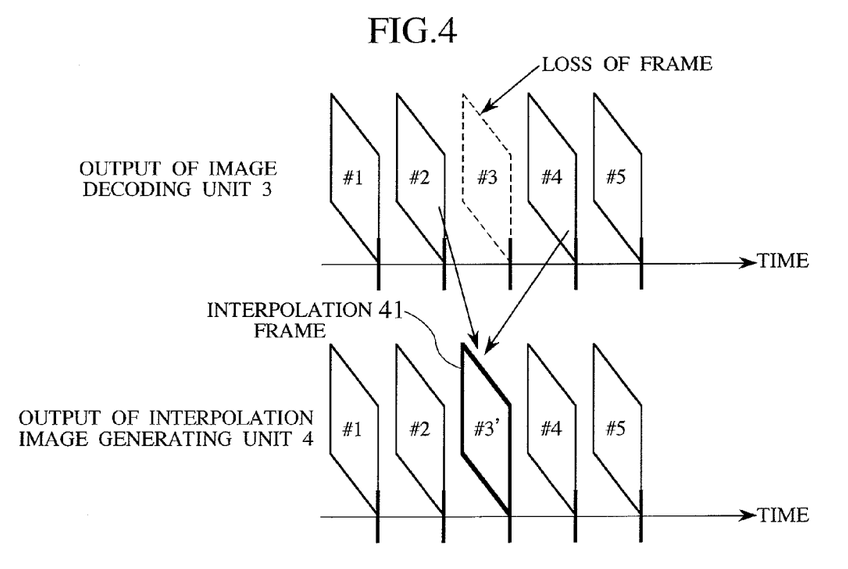
FIG. 4 is a diagram showing the concept of frame interpolation according to the first embodiment of the present invention.

The upper portion of FIG. 4 shows an image signal frame sequence decoded from an encoded bit stream by the image decoding unit 3. In FIG. 4, the frame sequence output from the image decoding unit 3 includes frames #1, #2, #4, and #5 but does not include a frame #3, which is lost due to an uncorrectable error. In this case, the interpolation image generating unit 4 generates an interpolation frame 41 (or a frame #3') based on the frames immediately preceding and succeeding the lost frame #3, that is, based on the frames #2 and #4, as shown in the lower portion of FIG. 4. The interpolation image generating unit 4 inserts the generated frame #3' into the frame sequence at the same position in time as the lost frame #3, restoring a complete frame sequence made up of the frames #1, #2, #3', #4, and #5. The restored frame sequence is input to the display unit 5. Thus, a continuous image data flow is maintained even if an image frame is lost, allowing the display unit 5 to display a high quality image.

Figure 5:
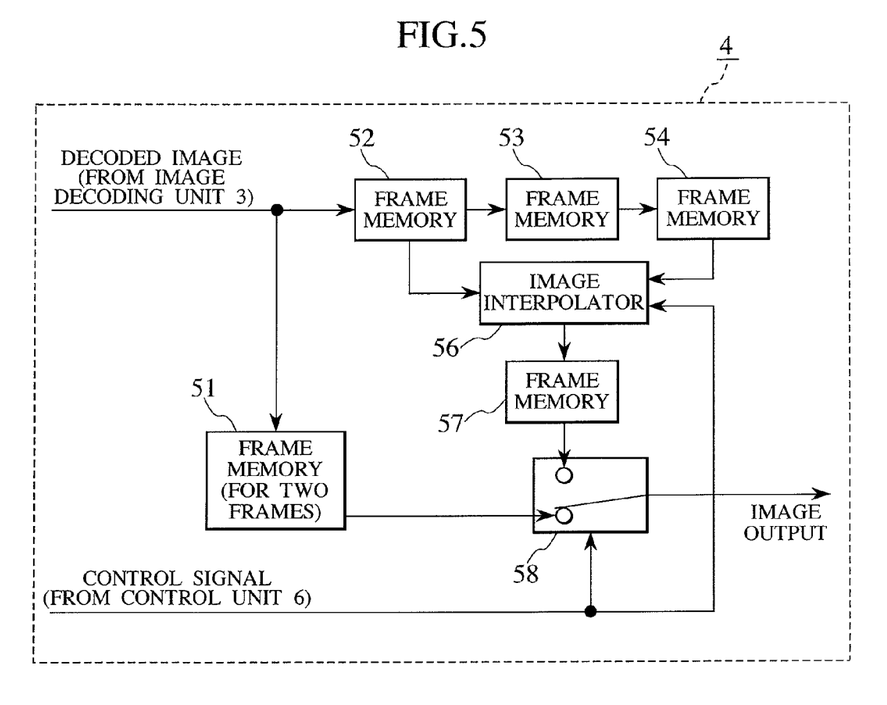
FIG. 5 is a diagram showing an exemplary configuration of an interpolation image generating unit 4 according to the first embodiment of the present invention.

FIG. 5 shows an exemplary circuit configuration (of the interpolation image generating unit 4) for performing the interpolation frame generation/insertion process shown in FIG. 4. The decoded image frame output from the image decoding unit 3 is input to a first frame memory 51 and a second frame memory 52. The first frame memory 51 has a capacity to store two image signal frames and has a function to delay an image signal frame by an amount of time equivalent to two frames. The image signal (or image frames) stored in the first frame memory 51 is input to one terminal of a first switch 58.

The second frame memory 52, on the other hand, temporarily stores one image frame (or an equivalent amount of image data) at a time. Each time a new frame is input to the second frame memory 52, the current contents of the second frame memory 52 (that is, the frame currently stored in the second frame memory 52) are output to and stored in a third frame memory 53 and the new frame is stored in the second frame memory 52 instead. The third frame memory 53 also has a function to temporarily store one image frame (or an equivalent amount of image data) at a time. As in the case with the second frame memory 52, each time a new frame is input from the second frame memory 52 to the third frame memory 53, the current contents of the third frame memory 53 (that is, the frame currently stored in the third frame memory 53) are output to and stored in the fourth frame memory 54 and the new frame is stored in the third frame memory 53 instead. For example, referring to FIGS. 4 and 5, assume that at time t1, the frames #1 is stored in the fourth frame memory 54, the frame #2 is stored in the third frame memory 53, and the frame #3 is stored in the second frame memory 52. Then, at time t2 one frame period after time t1, the frame #2 is stored in the fourth frame memory 54, the frame #3 is stored in the third frame memory 53, and the frame #4 is stored in the second frame memory 52. Thus, the contents of the second frame memory 52, the third frame memory 53, and the fourth frame memory 54 are updated at each frame period; the second to fourth frame memories 52 to 54 sequentially store a series of image signal frames decoded and output by the image decoding unit 3.

The image interpolator (or interpolation frame generating unit) 56 is designed to generate an interpolation frame based on the image signals stored in the second frame memory 52 and in the fourth frame memory 54. However, normally (i.e., when no error has been detected), the image interpolator 56 is not caused to operate. More specifically, the image interpolator 56 is controlled by a control signal from the control unit 6 such that it is only activated when an error has been detected and operates with a timing that allows it to generate an interpolation frame. Each interpolation frame is generated based on the image signals in two frames, one immediately preceding and the other immediately succeeding a lost frame, as described above. Therefore, the image interpolator 56 is caused to operate, for example, when the image data in the frame #3 (which is assumed to be corrupted or lost) is stored in the third frame memory 53, the data in the previous frame #2 is stored in the fourth frame memory 54, and the data in the subsequent frame #4 is stored in the second frame memory 52. In this state, the image interpolator 56 generates an interpolation frame (for example, the frame #3') and outputs it to a fifth frame memory 57 for storage. The interpolation frame stored in the fifth frame memory 57 is input to the other terminal of the first switch 58.

The first switch 58 is controlled by a control signal from the control unit 6 such that normally (i.e., when no error has been detected), the first switch 58 selects the terminal to which the first frame memory 51 is connected. More specifically, according to the present embodiment, normally, the interpolation image generating unit 4 outputs the decoded image signal received from the image decoding unit 3. On the other hand, when the control unit 6 has detected an error, it controls the first switch 58 to select the terminal to which the fifth frame memory 57 is connected with a timing coincident with the display timing of the lost frame. More specifically, according to the present embodiment, the interpolation image generating unit 4 outputs the interpolation frame generated by the image interpolator 56 with a timing coincident with the display timing of the lost frame.

Figure 6A:
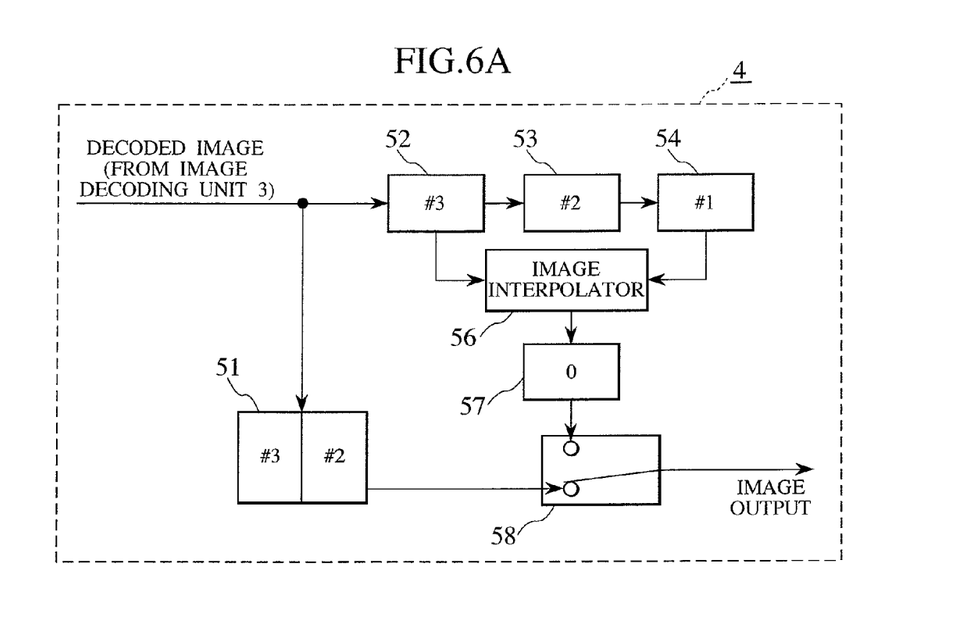
Figure 6B:
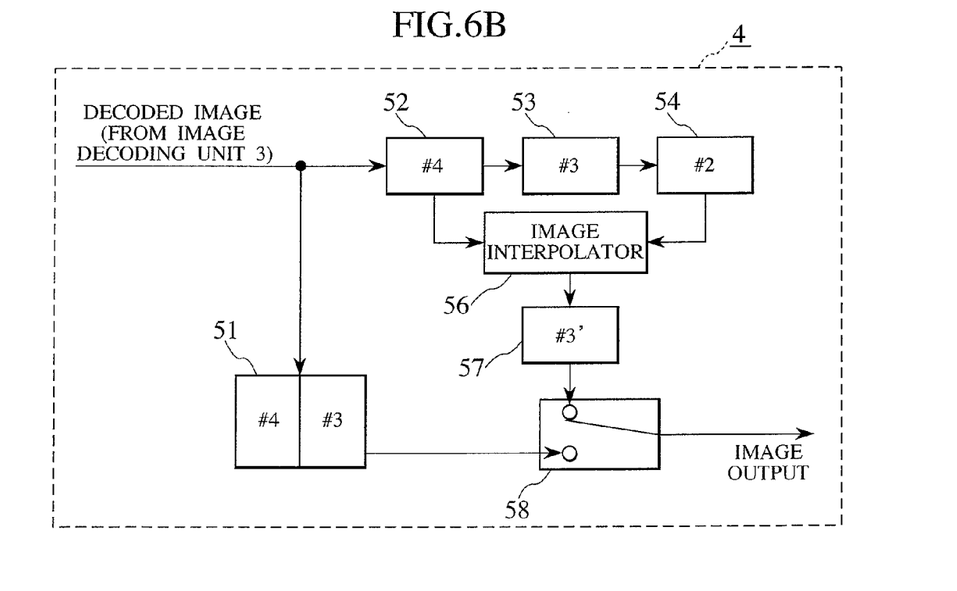

FIG. 6 (including FIGS. 6A and 6B) shows the state of each component of the interpolation image generating unit 4 at particular times t1 and t2. It should be noted that FIG. 6 differs from FIG. 5 in that FIG. 6 does not show the control signal line. Referring to FIG. 6A, at time t1, the image signals in the frame #2 and in the frame #3 (the lost or corrupted frame) are stored in the first frame memory 51. In this state, the image signal in the frame #2 is input to one terminal of the first switch 58, since the frame #2 precedes the frame #3. Since that one terminal of the first switch 58 is currently selected, the image signal in the frame #2 is selected and output from the interpolation image generating unit 4.

Further, the image signals in the frames #3, #2, and #1 are stored in the second to fourth frame memories 52 to 54, respectively, at time t1. In this state, the image interpolator 56 does not operate and hence does not generate an interpolation frame. Therefore, the fifth frame memory 57 currently stores no image data (in FIG. 6A, it stores a value of 0). It should be noted that at that time the contents of the fifth frame memory 57 are not output, since the terminal of the first switch 58 to which the fifth frame memory 57 is connected is not currently selected.

At time t2, on the other hand, the image signals in the frame #4, the frame #3 (the lost or corrupted frame), and the frame #2 are stored in the second to fourth frame memories 52 to 54, as shown in FIG. 6B. In this state, since the image interpolator 56 can obtain information about the lost (or corrupted) frame #3 from the preceding and succeeding frames (#2 and #4), the image interpolator 56 operates to generate the interpolation frame #3'. That is, the image interpolator 56 generates the interpolation frame #3' based on the image signals stored in the second frame memory 52 and the fourth frame memory 54. The generated interpolation frame #3' is stored in the fifth frame memory 57.

On the other hand, the image signals in the lost or corrupted frame #3 and in the frame #4 are stored in the first frame memory 51 at time t2. Since the frame #3 precedes the frame #4, the image signal (for example, a value of 0) in the frame #3 is input to one terminal of the first switch 58. However, the first switch 58 outputs the interpolation frame #3' stored in the fifth frame memory 57, since at that time the first switch 58 selects the other terminal. Then, at the next frame period, the first switch 58 selects the one terminal again to output the image signal stored in the first frame memory 51, that is, the image signal in the frame #4.

Operating in this manner, the interpolation image generating unit 4 sequentially outputs the frames #1, #2, #3', #4, and #5, that is, the frame sequence shown in the lower portion of FIG. 4.

The image interpolator 56 of the present embodiment calculates motion vectors based on the two frames immediately preceding and succeeding a lost frame and generates an interpolation frame by use of the determined motion vectors. It should be noted that it is possible to use the image interpolation method by use of a motion vector disclosed in Japanese Laid-Open Patent Publication No. 11-112939, instead of the above-described method. This technique performs image frame interpolation through motion detection using block matching. There will now be described an exemplary frame interpolation method using a motion vector on a per-pixel basis.

This method begins by examining the frame immediately preceding and the frame immediately succeeding the interpolation frame (or the lost frame) to determine each pair of pixels (each pixel in one of these preceding and succeeding frames) that are symmetrical with respect to a particular pixel in the interpolation frame. Then, a motion vector for the particular pixel (on a per-pixel basis) is calculated based on information about these determined pairs of pixels. This method will be described in detail with reference to FIG. 7.

Figure 7:
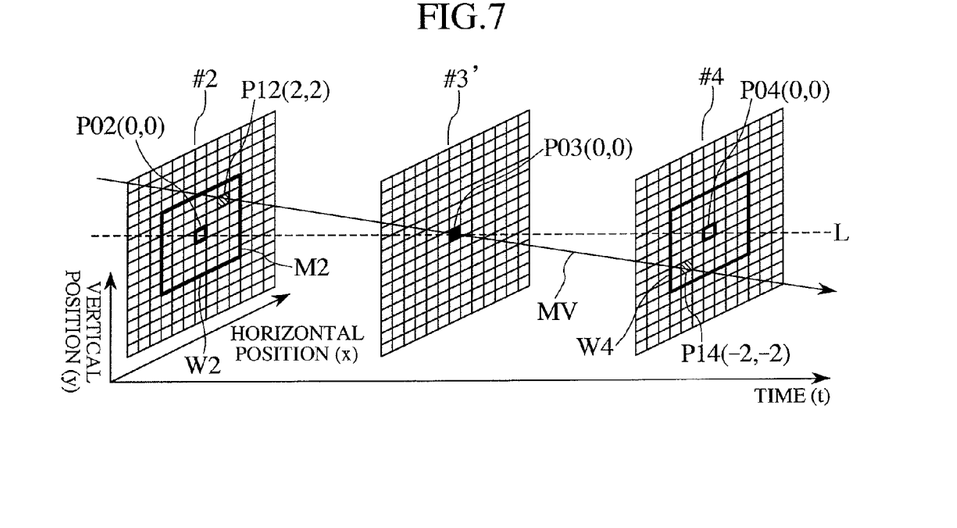
FIG. 7 is a diagram showing an exemplary interpolation frame generating process performed by an image interpolator 56 according to the first embodiment of the present invention.

In FIG. 7, the x-axis represents the horizontal position of the frames, the y-axis represents the vertical position of the frames, and the remaining axis (or z-axis) represents time t. Let numeral P03 denote a pixel (or interpolation pixel) in the interpolation frame (which is assumed to be the frame #3' in FIG. 4). Further, the coordinates of the pixel P03 are assumed to be (0, 0), for convenience.

First, search windows W2 and W4 each indicating an area for detecting a motion vector are set for the preceding frame #2 and the succeeding frame #4, respectively. For example, the search window W2 in the preceding frame #2 includes 49 pixels (7 pixels in the x-axis direction by 7 pixels in the y-axis direction), and a center pixel P02 of the search window W2 is located at the same spatial position in the preceding frame #2 as the interpolation pixel P03 is located in the interpolation frame #3', as shown in FIG. 7. That is, referring to FIG. 7, the pixel P02 is located at the point at which an axis L intersects the preceding frame #2. Likewise, the search window W4 in the succeeding frame #4 includes 49 pixels (7 pixels in the x-axis direction by 7 pixels in the y-axis direction), and a center pixel P04 of the search window W4 is located at the same spatial position in the succeeding frame #4 as the interpolation position P03 is located in the interpolation frame #3', as shown in FIG. 7. That is, referring to FIG. 7, the pixel P04 is located at the point at which the axis L intersects the succeeding frame #4. The coordinates of the pixels P02 and P04 are both assumed to be (0, 0), for convenience.

Then, straight lines are drawn each passing through a different pixel in the search window W2, the interpolation pixel P03, and a different pixel in the search window W4. (Naturally, these pixels in the search windows are symmetrical about the interpolation pixel P03, as shown in FIG. 7.) For example, a line that passes through the pixel at the upper left corner coordinates (−3, 3) of the search window W2 and the interpolation pixel P03 passes through the pixel at the lower right corner coordinates (3, −3) of the search window W4, as shown in FIG. 7. Since the search windows W2 and W4 are each made up of 49 pixels (7×7 pixels), there are 49 such lines passing through the interpolation pixel P03.

Then, for each of these 49 lines, a calculation is done to determine a difference (for example, the luminance difference) between the pixels in the search windows W2 and W4 connected by the line. Then, the line that connects pixels having the smallest difference (in luminance) is set as a motion vector for the interpolation pixel P03. In the example shown in FIG. 7, a pixel P12 at coordinates (2, 2) of the search window W2 and a pixel P14 at coordinates (−2, 2) of the search window W4 are assumed to have the smallest difference (in luminance). Therefore, the straight line connecting the pixel P12, the interpolation pixel P03, and the pixel P14 is set as a motion vector MV for the interpolation pixel P03. That is, the pixel P12 in the preceding frame #2 is assumed to move in the direction indicated by the motion vector MV. (The pixel P03 in the lost or corrupted frame #3, or the interpolation frame #3', and the pixel P14 in the succeeding frame #4 are assumed to be results of the pixel P12 moving in that direction.)

Then, the luminance or pixel value of the interpolation pixel P03 is determined based on the above motion vector MV. Specifically, the luminance or pixel values of the pixels P12 and P14 in the preceding frame #2 and in the succeeding frame #4, respectively, may be averaged, and the average value may be set as the value of the interpolation pixel P03. Or the luminance or pixel value of the interpolation pixel P03 may be determined according to the following equation:

$$P03 = k*P02 + (1-k)*P04,$$  (Equation 1)

where k is a weighting coefficient indicating the proportion of the pixel P02 and is smaller than 1. For example, the weighting coefficient may be determined based on the time interval between the preceding frame #2 and the interpolation frame #3' and the time interval between the interpolation frame #3' and the succeeding frame #4. According to the present embodiment, the luminance or pixel values of the two pixels are averaged (that is, k=0.5) since the frame interval is fixed.

The luminance or pixel values for all pixels in the interpolation frame #3' are determined through such calculation. The interpolation frame #3' thus determined is stored in the fifth frame memory 57, as described above. Further, the interpolation frame #3' is output through the first switch 58 with a timing coincident with the display timing of the lost frame #3 (that is, for the frame period following the frame #2).

It should be noted that although in the above example a motion vector is determined on a per-interpolation pixel basis, the present embodiment is not limited to such a particular arrangement. The interpolation frame may be divided into blocks each made up of 5×5 pixels and a motion vector may be determined on a per-block basis. Further, a motion vector for an interpolation pixel may be determined based on a determined motion vector for an adjacent interpolation pixel. Further, although the above example uses search windows each made up of 7×7 pixels, search windows of a different size may be used. Further, the search windows need not necessarily have equal numbers of pixels in the horizontal and vertical directions. Still further, although in the above example motion vectors for the pixels in a lost or corrupted frame are determined based on two frames (one immediately preceding and the other immediately succeeding the lost frame), they may be determined based on four frames (specifically, based on the two preceding frames and the two succeeding frames).

As described above, the present embodiment provides a technique of appropriately compensating for loss of even an entire frame from a received encoded bit stream due to an uncorrectable error by generating an interpolation frame by use of a motion compensation technique and displaying it instead of the lost frame. Therefore, the present embodiment allows an image display apparatus to display high quality video with smooth motion even when an image frame is lost.

Second Embodiment

Figure 8:
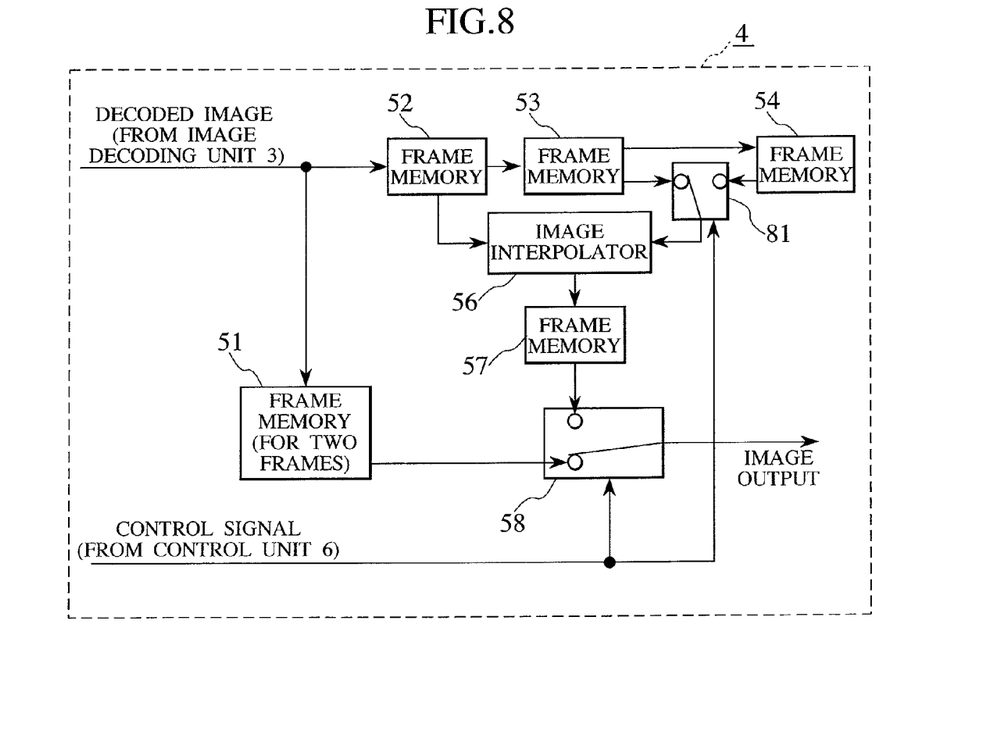
FIG. 8 is a diagram showing an exemplary configuration of an interpolation image generating unit 4 according to a second embodiment of the present invention.

A second embodiment of the present invention will now be described. The second embodiment differs from the first embodiment in that the second embodiment creates an interpolation frame regardless of the presence or absence of a lost or corrupted frame, whereas the first embodiment creates a interpolation frame only when a frame has been corrupted or lost. The second embodiment may be applied to an image display apparatus having a function to vary its image frame rate by periodically inserting interpolation frames into a received image frame sequence. FIG. 8 shows an exemplary configuration of such an image display apparatus.

Specifically, FIG. 8 shows an interpolation image generating unit 4 according to the present embodiment. The interpolation image generating unit 4 of the present embodiment differs from that of the first embodiment in that it additionally includes a second switch 81 controlled by a control signal from the control unit 6. The second switch 81 selects either the image signal stored in the third frame memory 53 or the image signal stored in the fourth frame memory 54 and outputs it to the image interpolator 56.

The interpolation image generating unit 4 of the second embodiment has a function to increase the frame rate of an image sequence decoded from an encoded bit stream. For example, when the original frame rate is 30 Hz (i.e., 30 frames per second), the interpolation image generating unit 4 converts it to 60 Hz (i.e., doubles the frame rate). Normally (i.e., when no error has been detected), the second switch 81 is operated so as to select the image signal in the third frame memory 53. As a result, the image interpolator 6 generates an interpolation frame based on the image signals stored in the second frame memory 52 and in the third frame memory 53. For example, when the image signals in the frames #1 and #2 are stored in the third frame memory 53 and the second frame memory 52, respectively, the image interpolator 6 generates an interpolation frame #1' based on the frames #1 and #2 and stores it in the fifth frame memory 57.

On the other hand, the first switch 58 is controlled by the control unit 6 so as to switch between the two terminals connected to the first frame memory 51 and the fifth frame memory 57, respectively, every half frame cycle. Specifically, for example, the first switch 58 selects the image signal from the first frame memory 51 during the first half of each frame period and selects the image signal from the fifth frame memory 57 during the second half of each frame period. Therefore, the first switch 58 outputs the frames #1 and #1' during the first and second halves, respectively, of the first frame period, and outputs the frames #2 and #2' during the first and second halves, respectively, of the second frame period. That is, the first switch 58 outputs a frame sequence made up of the frames #1, #1', #2, #2', and so on. Thus, interpolation frames are inserted between adjacent frames in the decoded image signal frame sequence, thereby doubling the frame rate of the image signal sequence supplied to the display unit 5. Each interpolation frame is created in a manner similar to that described in connection with the first embodiment with reference to FIG. 7. However, the time intervals between each interpolation frame and the preceding and succeeding frames are half of those for the first embodiment. It should be noted that although the fourth frame memory 54 also stores an image signal, this image signal is normally not used (that is, it is used only when an image frame is lost).

Figure 9:
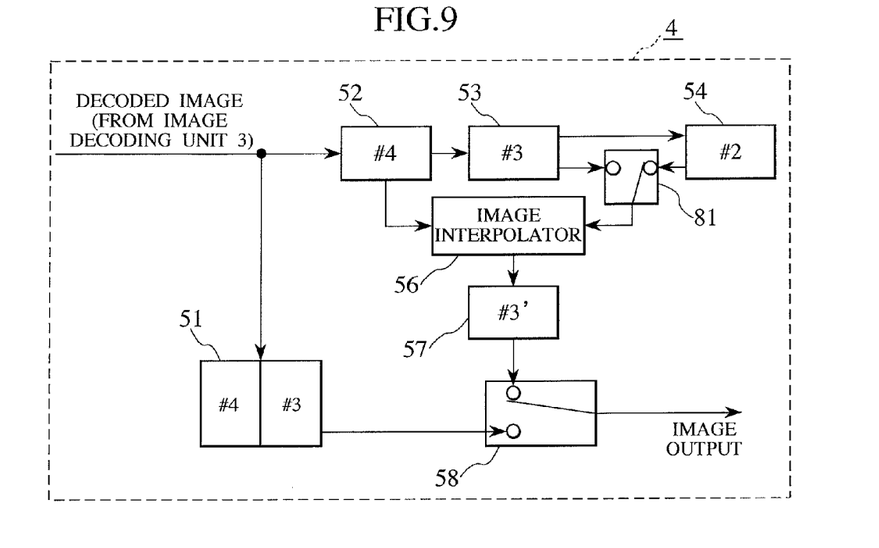
FIG. 9 is a diagram showing an exemplary operation of the interpolation image generating unit 4 according to the second embodiment of the present invention.

There will now be described the operation performed by the interpolation image generating unit 4 of the present embodiment when an image frame is lost or corrupted with reference to FIG. 9. Assume that the frame #3 is lost or corrupted. In such a case, the second switch 81 is controlled by the control unit 6 so as to switch from the terminal connected to the third frame memory 53 to the terminal connected to the fourth frame memory 54 when it is time to store the lost or corrupted frame #3 in the third frame memory 53. Since the fourth frame memory 54 currently stores the frame #2, the image signal in the frame #2 is input to the image interpolator 56 through the second switch 81. The image interpolator 56 generates an interpolation frame #3' (a replacement for the frame #3) based on the image signals in the frame #2 and in the frame #4 and outputs it to the fifth frame memory 57. Thus, the interpolation frame #3' is stored in the fifth frame memory 57. It should be noted that the interpolation frame #3' is generated in the same manner as described with reference to FIG. 7.

On the other hand, the image signals in the lost or corrupted frame #3 and the frame #4 are stored in the first frame memory 51. Since the lost or corrupted frame #3 precedes the frame #4, the image signal (0) in the frame #3 is input to the first switch 58. However, since at that time the first switch 58 is controlled by the control unit 6 so as to switch to the terminal connected to the fifth frame memory 57, the first switch 58 selects the interpolation frame #3' stored in the fifth frame memory 57 and outputs it.

Then, the second switch 81 is caused to switch to the terminal connected to the third frame memory 53 again to allow the image interpolator 56 to generate an interpolation frame based on two adjacent frames in the same manner as described above. Then, the first switch 58 operates to switch between the two terminals connected to the first frame memory 51 and the fifth frame memory 57, respectively, every half frame cycle again. That is, the interpolation image generating unit 4 of the present embodiment resumes the processing to double the frame rate after outputting the interpolation frame #3'.

Thus, the image display apparatus of the present embodiment appropriately replaces a lost frame through frame interpolation by utilizing its own frame rate conversion function. This means that the image display apparatus can replace a lost frame while converting the image frame rate.

It should be noted that the image interpolator 56 cannot generate an interpolation frame while the lost or corrupted frame #3 is stored in the second frame memory 52. This problem may be circumvented by outputting the image signal in the interpolation frame #1' stored in the fifth frame memory 57 or the image signal in the frame #2 stored in the first frame memory 51.

The present embodiment has been described with reference to an exemplary image display apparatus in which the frame rate of the decoded image sequence is converted from 30 Hz to 60 Hz. However, the present embodiment can be applied to image display apparatuses in which the frame rate of the decoded image sequence is converted from 60 Hz to 120 Hz, or from 50 Hz to 60 Hz, with the same effect.

Third Embodiment

Figure 10:
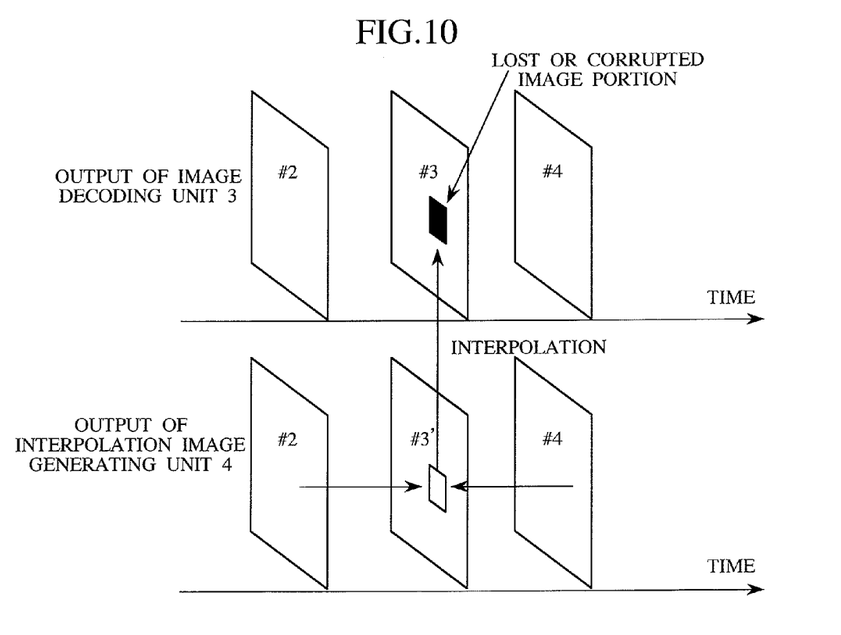
FIG. 10 is a diagram illustrating a third embodiment of the present invention.

The image display apparatuses of the first and second embodiments described above are designed to replace an entire lost frame by frame interpolation. However, the present invention can also be applied to replace a lost portion of an image frame by interpolation. FIG. 10 shows an exemplary process.

For example, referring to FIG. 10, assume that a macroblock in the frame #3 has suffered an uncorrectable error and hence the image in the macroblock cannot be decoded. This means that that image portion of the frame #3 is lost. According to the present embodiment, this lost image portion is replaced with an interpolation image portion created based on two frames, one immediately preceding and the other immediately succeeding the frame #3. This interpolation image portion is generated by a circuit similar to that of the first embodiment described with reference to FIG. 5 and in a manner similar to that described with reference to FIG. 7. Specifically, the image signal in the frame #2 (preceding the frame #3) is stored in the second frame memory 52, and the image signal in the succeeding frame #4 is stored in the fourth frame memory 54. Then, the image interpolator 56 determines a motion vector for each pixel in the lost image portion and thereby determines (the luminance or pixel value of) the pixel based on the preceding frame #2 and the succeeding frame #4 stored in the second frame memory 52 and the fourth frame memory 54, respectively, using the technique shown in FIG. 7. Through this process, the image interpolator 56 generates an interpolation image portion for replacing the lost image portion. The interpolation image portion thus generated is stored in the fifth frame memory 57. Then, the first switch 58 is controlled by the control unit 6 such that the interpolation image portion stored in the fifth frame memory 57 seamlessly replaces the lost image portion of the frame #3. Specifically, the control unit 6 detects the periods for the lost image portion of the frame #3 and controls the first switch 58 so as to select the interpolation image portion during these periods (horizontal and vertical). This causes the lost image portion of the frame #3 to be replaced by the interpolation image portion, thereby allowing display of an uncorrupted image.

Thus, the image display apparatus of the present embodiment can appropriately replace not only an entire lost frame but also a lost portion of a frame separately by interpolation. Therefore, the image display apparatus can display an uncorrupted image even when a macroblock in an image frame has been corrupted or lost due to an uncorrectable error.

Fourth Embodiment

Figure 11:
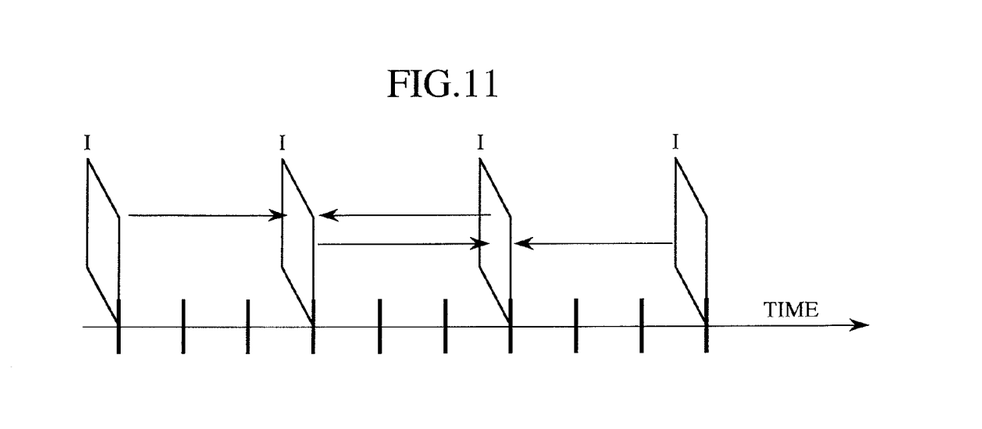
FIG. 11 is a diagram illustrating a fourth embodiment of the present invention.
Figure 12:
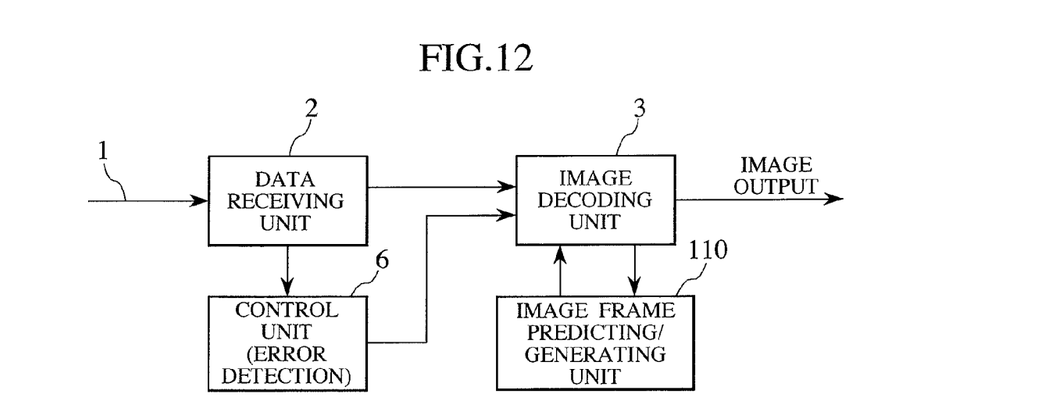
FIG. 12 is another diagram illustrating the fourth embodiment of the present invention.

A fourth embodiment of the present invention will be described with reference to FIGS. 11 and 12. This embodiment only replaces lost or corrupted I frames through frame interpolation. (P and B frames are not replaced even if they are corrupted or lost.) As is known, each I frame is encoded independently and hence can be decoded without using P and B frames. P and B frames, on the other hand, are created based on I frames. Therefore, loss of an I frame due to a data error, etc. prevents P and B frames from being generated. As shown in FIG. 11, I frames are generated periodically or non-periodically, and a few to a few tens of P and/or B frames are inserted between adjacent I frames. This means that if an I frame has been lost, no frames are subsequently available for image processing for a considerable period of time, resulting in degraded display image quality. To prevent such frame loss, the present embodiment replaces at least lost I frames through frame interpolation. More specifically, according to the present embodiment, each interpolation I frame is generated based on a plurality of I frames, as shown in FIG. 11.

An image display apparatus of the present embodiment will be described with reference to FIG. 12. It should be noted that components similar in operation to those shown in FIG. 3 retain the same reference numerals, and a detailed description thereof is not provided herein. Of the image data decoded by the image decoding unit 3, only the I frames are input to an image frame predicting/generating unit 110, which predicts and generates past and future I frames based on the properly received I frames by use of a motion compensation technique.

The image decoding unit 3 determines whether or not a received I frame is corrupted based on data error information obtained by the control unit 6. If the received I frame is not corrupted, the image decoding unit 3 decodes it. On the other hand, if the I frame is corrupted (due to a data error, etc.), the image decoding unit 3 replaces it with a predicted frame generated by the image frame predicting/generating unit 110. The image decoding unit 3 then decodes the predicted frame (generated by the image frame predicting/generating unit 110) instead of the corrupted I frame and further decodes P and B frames using data of the decoded I frame. It should be noted that not only corrupted I frames but also corrupted P frames may be replaced with predicted frames.

While we have shown and described several embodiments in accordance with our invention, it should be understood that disclosed embodiments are susceptible to changes and modifications without departing from the scope of the invention. Therefore, we do not intend to be bound by the details shown and described herein but intend to cover all such changes and modifications as fall within the ambit of the appended claims.

What is claimed is:

1. An image display apparatus comprising:
a data receiving unit configured to receive an encoded bit stream;
a decoding unit configured to receive the encoded bit stream from the data receiving unit and to decode the encoded bit stream, in order to generate an image signal;
a detecting unit configured to detect whether a frame has been lost from the encoded bit stream due to an error;
an image interpolation unit configured to receive the image signal from the decoding unit and to output an interpolation frame or the image signal, the image interpolation unit including an interpolation frame generating unit configured to determine a motion vector for the interpolation frame and to generate the interpolation frame based on the image signal received from the decoding unit; and
a display unit configured to display an image based on a signal received from the image interpolation unit;
wherein when the detecting unit detects that a frame has been lost, the image interpolation unit supplies the interpolation frame in place of the lost frame to the display unit, with the timing of the lost frame;
wherein the interpolation frame generating unit is configured to generate the interpolation frame based on image signals in at least the frame preceding and the frame succeeding the lost frame.

2. The image display apparatus according to claim 1, wherein the image interpolation unit includes a switch configured to switch between the interpolation frame received from the interpolation frame generating unit and a frame of the image signal received from the decoding unit.

3. The image display apparatus according to claim 2, wherein the switch is configured to select the interpolation frame with the timing of the lost frame and to select a frame of the image signal with other timings.

4. The image display apparatus according to claim 1, wherein the interpolation frame generating unit is configured to generate the interpolation frame based on frames of the image signal received from the decoding unit.

5. The image display apparatus according to claim 1, wherein the interpolation frame generating unit is configured to determine a motion vector for each pixel in the interpolation frame based on the image signals in at least the frame preceding and the frame succeeding the lost frame, and configured to generate the each pixel or determines the luminance or pixel value of the each pixel based on the luminance or pixel values of pixels in at least the frame preceding and the frame succeeding the lost frame, the pixels in the at least the frame preceding and the frame succeeding the lost frame being indicated by the determined motion vector for the each pixel.

6. The image display apparatus according to claim 5, wherein the luminance or pixel value of the each pixel in the interpolation frame is determined based on an average of the luminance or pixel values of the pixels in at least the frame preceding and the frame succeeding the lost frame, the pixels in the at least the frame preceding and the frame succeeding being indicated by the determined motion vector for the each pixel.

7. An image display apparatus comprising:
a data receiving unit configured to receive an encoded bit stream;
a decoding unit configured to receive the encoded bit stream from the data receiving unit and to decode the encoded bit stream, in order to generate an image signal;

an image interpolation unit configured to receive the image signal from the decoding unit and to output either an interpolation frame or a frame of the image signal, the image interpolation unit including an interpolation frame generating unit configured to determine a motion vector for the interpolation frame and to generate the interpolation frame based on at least the frame preceding and the frame succeeding a lost frame of the image signal by use of a motion compensation technique;

a control unit configured to detect whether a frame has been lost from the encoded bit stream due to an error, and to control the interpolation frame generating unit based on the detection result; and a display unit configured to display an image based on an image signal frame received from the interpolation frame generating unit or the decoding unit;

wherein when the control unit detects that a frame has been lost, the control unit controls the image interpolation unit to output the interpolation frame in place of the lost frame.

8. The image display apparatus according to claim 7, wherein:

the image interpolation unit includes a switch configured to select and output either a frame of the image signal received from the decoding unit or the interpolation frame received from the interpolation frame generating unit; and when the control unit has detected loss of a frame of the image signal, the control unit is configured to control the switch to select the interpolation frame instead of the lost frame; and when the control unit has not detected loss of a frame of the image signal, the control unit is configured to control the switch to select the frame of the image signal received from the decoding unit.

9. The image display apparatus according to claim 8, wherein the control unit is configured to control the switch to insert the interpolation frame into a frame sequence at the same position in time as the lost frame, the frame sequence constituting the decoded image signal.

10. The image display apparatus according to claim 7, wherein the image interpolation unit can vary the frame rate of the decoded image signal.

11. The image display apparatus according to claim 7, wherein the data receiving unit receives encoded data transmitted through a network in IP broadcasting.

12. The image display apparatus according to claim 7, wherein the control unit is configured to determine that a frame of the decoded image signal has been lost when the decoding unit has not been able to decode the frame from the encoded bit stream due to an uncorrectable error.

13. The image display apparatus according to claim 12, wherein the control unit is configured to detect each frame in the encoded bit stream according to the syntax of the encoded bit stream.

14. The image display apparatus according to claim 7, wherein the image interpolation unit is configured to only replace corrupted or lost I frames in the encoded bit stream through frame interpolation.

15. The image display apparatus according to claim 7, wherein the image interpolation unit is configured to replace corrupted or lost I and P frames in the encoded bit stream through frame interpolation.

* * * * *